(12) United States Patent
Vorberg et al.

(10) Patent No.: US 8,269,037 B2
(45) Date of Patent: Sep. 18, 2012

(54) ABSORPTION MEDIUM FOR REMOVING ACID GASES WHICH COMPRISES AMINO ACID AND ACID PROMOTER

(75) Inventors: Gerald Vorberg, Speyer (DE); Torsten Katz, Neustadt (DE); Georg Sieder, Bad Dürkheim (DE); Christian Riemann, Altrip (DE); Rupert Wagner, Worms (DE); Ute Lichtfers, Karlsruhe (DE); Erika Dengler, Böhl-Iggelheim (DE)

(73) Assignee: BASF SE, Ludwigshafen (DE)

( * ) Notice: Subject to any disclaimer, the term of this patent is extended or adjusted under 35 U.S.C. 154(b) by 179 days.

(21) Appl. No.: 12/695,601

(22) Filed: Jan. 28, 2010

(65) Prior Publication Data
US 2010/0186590 A1 Jul. 29, 2010

(30) Foreign Application Priority Data
Jan. 29, 2009 (EP) .................... 09151655

(51) Int. Cl.
*C07F 9/38* (2006.01)
*C07C 229/04* (2006.01)
*B01D 53/40* (2006.01)

(52) U.S. Cl. ............. 562/21; 562/8; 562/20; 562/23; 562/553; 562/575; 423/210; 423/220; 423/223; 423/226; 423/228; 423/235; 423/240 R; 423/242.1; 423/242.2; 423/242.3; 423/242.7; 423/243.01; 423/243.08; 423/245.1; 423/245.2

(58) Field of Classification Search .............. 423/220, 423/223, 226, 228, 235, 240 R, 242.1, 242.2, 423/242.3, 242.7, 243.01, 243.08, 245.1, 423/245.2; 562/8, 20, 21, 23, 553, 561, 562, 562/563, 565, 571, 573, 575
See application file for complete search history.

(56) References Cited

U.S. PATENT DOCUMENTS
4,094,957 A 6/1978 Sartori et al.
(Continued)

FOREIGN PATENT DOCUMENTS
DE 10028637 12/2001
(Continued)

OTHER PUBLICATIONS
Chemical Book, "Diethylenetriaminepentaacetic acid(67-43-6)." (2008). Viewed Nov. 30, 2011 at http://www.chemicalbook.com/ProductMSDSDetailCB5303977_EN.htm.*

(Continued)

*Primary Examiner* — Daniel C McCracken
*Assistant Examiner* — Daniel Berns
(74) *Attorney, Agent, or Firm* — Connolly Bove Lodge & Hutz LLP

(57) ABSTRACT

An absorption medium for removing acid gases from a fluid stream comprises an aqueous solution of a) of at least one metal salt of an aminocarboxylic acid, and b) of at least one acid promoter, wherein the molar ratio of b) to a) is in the range from 0.0005 to 1.0. The acid promoter is selected from mineral acids, carboxylic acids, sulfonic acids, organic phosphonic acids and partial esters thereof. The absorption medium, compared with absorption media based on amino acid salts, has a reduced regeneration energy requirement without significantly reducing the absorption capacity of the solution for acid gases. In a process for removing acid gases from the fluid stream, the fluid stream is brought into contact with the absorption medium.

10 Claims, 1 Drawing Sheet

U.S. PATENT DOCUMENTS

| | | | |
|---|---|---|---|
| 4,537,753 | A | 8/1985 | Wagner et al. |
| 4,551,158 | A | 11/1985 | Wagner et al. |
| 4,553,984 | A | 11/1985 | Volkamer et al. |
| 2006/0089281 | A1* | 4/2006 | Gibson .................. 510/201 |

FOREIGN PATENT DOCUMENTS

| | | |
|---|---|---|
| EP | 0 121 109 A2 | 10/1964 |
| EP | 134 946 A2 | 3/1985 |
| EP | 0 159 495 A2 | 10/1985 |
| EP | 0 190 434 A2 | 8/1986 |
| EP | 0 202 600 A2 | 11/1986 |
| EP | 0 359 991 A1 | 3/1990 |
| EP | 0671200 | 9/1995 |
| GB | 1543748 | 4/1979 |
| WO | WO-00/00271 | 1/2000 |
| WO | WO-2008/145658 | 12/2008 |
| WO | WO-2008/155394 | 12/2008 |
| WO | WO 2008/155394 * | 12/2008 |
| WO | WO-2009/063041 | 5/2009 |
| WO | WO-2009/147247 | 12/2009 |
| WO | WO-2009/156271 | 12/2009 |
| WO | WO-2009/156273 | 12/2009 |

OTHER PUBLICATIONS

DrugBank, "Etidronic acid." Jun. 13, 2005. Viewed Nov. 22, 2011 at http://www.drugbank.ca/drugs/DB01077.*

Benoit et al., "Solvent effect on the solution, ionization, and structure of aminosulfonic acids." Can. J. Chem., vol. 66 (1988), pp. 3038-3043.*

* cited by examiner

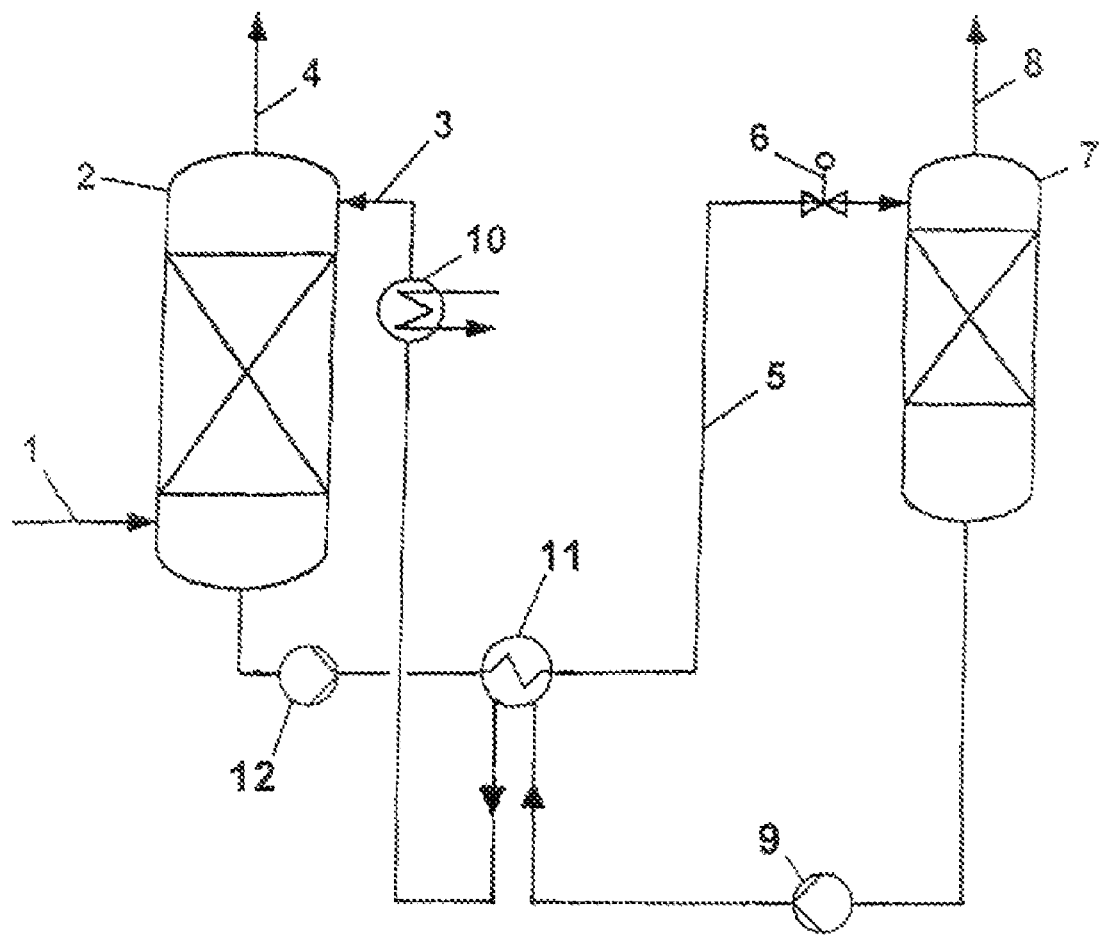

ABSORPTION MEDIUM FOR REMOVING ACID GASES WHICH COMPRISES AMINO ACID AND ACID PROMOTER

CROSS REFERENCE TO RELATED APPLICATIONS

This application claims priority to EP 09151655.9 filed Jan. 29, 2009, the entire contents of which is hereby incorporated by reference.

The present invention relates to an absorption medium and a process for removing acid gases from a fluid stream.

The removal of acid gases, such as, for example, $CO_2$, $H_2S$, $SO_2$, $CS_2$, HCN, COS or mercaptans, from fluid streams such as natural gas, refinery gas, synthesis gas, is of importance for differing reasons. The content of sulfur compounds of natural gas must be reduced by suitable treatment measures directly at the natural gas source, since the sulfur compounds, in the water which is frequently entrained by the natural gas, form acids which are corrosive. For transport of the natural gas in a pipeline, therefore, preset limiting values of the sulfur-comprising impurities must be complied with. Reduction of the content of carbon dioxide is frequently required for setting a predetermined calorific value.

For removal of acid gases, scrubbing with aqueous solutions of inorganic or organic bases is used. On dissolution of acid gases in the absorption medium, ions form with the bases. The absorption medium can be regenerated by expansion to a lower pressure and/or by stripping, wherein the ionic species react back to form acid gases and/or are stripped off by means of steam. After the regeneration process the absorption medium can be reused.

The use of amino acid salts in absorption media is known per se. GB 1 543 748 describes a process for removing $CO_2$ and $H_2S$ from a cracked gas using an aqueous solution of an alkali metal salt of an N-dialkyl α-aminomonocarboxylic acid, such as dimethylglycine.

U.S. Pat. No. 4,094,957 discloses the removal of $CO_2$ from gas streams using an absorption solution which comprises a basic alkali metal salt, a sterically hindered amine and an amino acid such as N,N-dimethylglycine.

EP-A 671 200 describes the removal of $CO_2$ from combustion gases at atmospheric pressure using an aqueous solution of an amino acid metal salt and piperazine.

EP-A 134 948 discloses an alkaline absorption medium, the absorption performance of which is improved by addition of an acid having a low $pK_a$.

| 20080931 | GMy/119 | Jan. 29, 2009 |

Amino acid salts have a high absorption energy for $H_2S$ and $CO_2$; accordingly, the regeneration energy to be used is also high. Absorption media based on amino acid salt have therefore been displaced by amines such as diethanolamine or methyldiethanolamine, the regeneration energies of which are lower.

The object of the invention is to specify a process and an absorption medium for removing acid gases from fluid streams, which absorption medium, compared with absorption media based on amino acid salts, exhibits a reduced regeneration energy requirement without significantly reducing the absorption capacity of the solution for acid gases.

The object is achieved by an absorption medium for removing acid gases from a fluid stream which comprises an aqueous solution a) of at least one metal salt of an aminocarboxylic acid, and
b) of at least one acid promoter, wherein the molar ratio of b) to a) is in the range from 0.0005 to 1.0, preferably 0.01 to 0.1, in particular 0.02 to 0.09.

Solutions of aminocarboxylic acid salts have advantageous properties as absorption media: (i) the salts of aminocarboxylic acids have virtually no vapor pressure and therefore, in contrast to amines, are not volatile; (ii) the hydrocarbon coabsorption is lower in aminocarboxylic acid salt solutions than in amine solutions; (iii) aminocarboxylic acid salts are more resistant to decomposition by oxygen; (iv) the acid gas capacity, in particular at low acid gas partial pressures, is higher than that of the known amines.

In the table hereinafter, the absorption energies of hydrogen sulfide and carbon dioxide are stated for various amine or amino acid salts:

| Heat of absorption | $H_2S$ (kJ/m³) | $CO_2$ (kJ/m³) |
|---|---|---|
| N,N-Dimethylglycine, potassium salt (35%) | 1520 | 2474 |
| N-Methylalanine, potassium salt (35%) | 1625 | 2985 |
| Monoethanolamine (15%) | 1500 | 1902 |
| Diethanolamine (30%) | 1140 | 1510 |
| Diisopropanolamine (40%) | 1230 | 1750 |
| Methyldiethanolamine (50%) | 1045 | 1340 |

Amino acid salts have higher absorption energies than customary amines. In the regeneration of the absorption medium, absorption energy must be applied again in order to desorb the bound acid gases. That is to say the regeneration energy to be employed for the amino acid salts is higher than that of the amines. For a given energy input in the desorber, e.g. using methyldiethanolamine, significantly lower acid gas residual loadings are achieved, which leads to a lower acid gas residual concentration of the treated fluid leaving the absorber.

It has now been found that by addition of an acid promoter the regeneration energy which is to be employed for aminocarboxylic acid salt solutions can be markedly reduced.

Owing to the stronger basicity of aminocarboxylic acid salt solutions and the presence of metal cations, absorbed acid gases can react to form a doubly charged species which is illustrated hereinafter by the example of $H_2S$ absorption (AA=amino acid; $M^+$=metal cation). The action of the acid promoter is presumed to be based on shifting the equilibrium of equation (2) from the difficult to regenerate sulfide ion ($S^{2-}$) to the more easily regenerable hydrogensulfide ion ($HS^-$).

  (1)

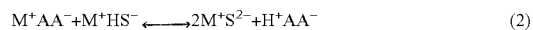  (2)

The acid promoter is selected in a suitable manner from protonic acids (Brönstedt acids) having a $pK_a$ of less than 6, in particular less than 5, or non-quaternary ammonium salts thereof. In the case of an acid having a plurality of dissociation stages and accordingly a plurality of $pK_a$s, this requirement is met when one of the $pK_a$s is in the stated range.

In preferred embodiments, the acid promoter comprises a multibasic acid.

Generally, the acid promoter is selected from mineral acids, carboxylic acids, sulfonic acids, organic phosphonic acids and partial esters thereof.

Suitable acid promoters are, for example, mineral acids, such as hydrochloric acid, sulfuric acid, amidosulfuric acid, phosphoric acid, partial esters of phosphoric acid, e.g. mono- and dialkyl- and -arylphosphates such as tridecyl phosphate, dibutyl phosphate, diphenyl phosphate and bis-(2-ethylhexyl)phosphate; boric acid;

carboxylic acids, for example saturated aliphatic monocarboxylic acids such as formic acid, acetic acid, propionic acid, butyric acid, isobutyric acid, valeric acid, isovaleric acid, pivalic acid, caproic acid, n-heptanoic acid, caprylic acid, 2-ethylhexanoic acid, pelargonic acid, neodecanoic acid, undecanoic acid, lauric acid, tridecanoic acid, myristic acid, pentadecanoic acid, palmitic acid, margaric acid, stearic acid, isostearic acid, arachic acid, behenic acid; saturated aliphatic polycarboxylic acids such as oxalic acid, malonic acid, succinic acid, glutaric acid, adipic acid, pimelic acid, suberic acid, azelaic acid, sebacic acid, dodecanedioic acid; cycloaliphatic mono- and polycarboxylic acids such as cyclohexanecarboxylic acid, hexahydrophthalic acid, tetrahydrophthalic acid, resin acids, naphthenic acids; aliphatic hydroxycarboxylic acids such as glycolic acid, lactic acid, mandelic acid, hydroxybutyric acid, tartaric acid, malic acid, citric acid; halogenated aliphatic carboxylic acids such as trichloroacetic acid or 2-chloropropionic acid; aromatic mono- and polycarboxylic acids such as benzoic acid, salicylic acid, gallic acid, the positional isomeric tolylic acids, methoxybenzoic acids, chlorobenzoic acids, nitrobenzoic acids, phthalic acid, terephthalic acid, isophthalic acid; technical carboxylic acid mixtures such as, for example, versatic acids;

sulfonic acids, such as methylsulfonic acid, butylsulfonic acid, 3-hydroxypropylsulfonic acid, sulfoacetic acid, benzenesulfonic acid, p-toluenesulfonic acid, p-xylenesulfonic acid, 4-dodecylbenzenesulfonic acid, 1-naphthalenesulfonic acid, dinonylnaphthalenesulfonic acid and dinonylnaphthalenedisulfonic acid, trifluoromethyl- or nonafluoro-n-butyl-sulfonic acid, camphorsulfonic acid;

organic phosphonic acids, for example phosphonic acids of the formula I

$$R\text{—}PO_3H \quad (I)$$

where R is $C_1$-$C_{18}$-alkyl which is optionally substituted by up to four substituents which are independently selected from carboxyl, carboxamido, hydroxyl and amino.

These include alkylphosphonic acids, such as methylphosphonic acid, propylphosphonic acid, 2-methylpropylphosphonic acid, t-butylphosphonic acid, n-butylphosphonic acid, 2,3-dimethylbutylphosphonic acid, octylphosphonic acid;

hydroxyalkylphosphonic acids, such as hydroxymethylphosphonic acid, 1-hydroxyethylphosphonic acid, 2-hydroxyethylphosphonic acid; arylphosphonic acids such as phenylphosphonic acid, toluylphosphonic acid, xylylphosphonic acid, aminoalkylphosphonic acids such as aminomethylphosphonic acid, 1-aminoethylphosphonic acid, 1-dimethylaminoethylphosphonic acid, 2-aminoethylphosphonic acid, 2-(N-methylamino)ethylphosphonic acid, 3-aminopropylphosphonic acid, 2-aminopropylphosphonic acid, 1-aminopropylphosphonic acid, 1-aminopropyl-2-chloropropylphosphonic acid, 2-aminobutylphosphonic acid, 3-aminobutylphosphonic acid, 1-aminobutylphosphonic acid, 4-aminobutylphosphonic acid, 2-aminopentylphosphonic acid, 5-aminopentylphosphonic acid, 2-aminohexylphosphonic acid, 5-aminohexylphosphonic acid, 2-aminooctylphosphonic acid, 1-aminooctylphosphonic acid, 1-aminobutylphosphonic acid; amidoalkylphosphonic acids such as 3-hydroxymethylamino-3-oxopropylphosphonic acid; and phosphonocarboxylic acids such as 2-hydroxyphosphonoacetic acid and 2-phosphonobutane-1,2,4-tricarboxylic acid.

Phosphonic acids of the formula II

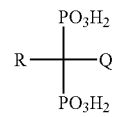

$$\text{(II)}$$

where R is H or $C_{1-6}$-alkyl, Q is H, OH or $NY_2$ and Y is H or $CH_2PO_3H_2$, such as 1-hydroxyethane-1,1-diphosphonic acid;

phosphonic acids of the formula III

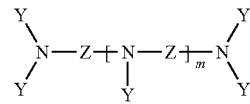

$$\text{(III)}$$

where Z is $C_{2-6}$-alkylene, cycloalkanediyl, phenylene, or $C_{2-6}$-alkylene which is interrupted by cycloalkanediyl or phenylene, Y is $CH_2PO_3H_2$ and m is 0 to 4, such as ethylenediaminetetra(methylenephosphonic acid), diethylenetriaminepenta(methylenephosphonic acid) and bis(hexamethylene)triaminepenta(methylenephosphonic acid);

phosphonic acids of the formula IV $$R\text{—}NY_2 \quad (IV)$$

where R is $C_{1-8}$-alkyl, $C_{2-6}$-hydroxyalkyl or Y and Y is $CH_2PO_3H_2$, such as nitrilo-tris(methylenephosphonic acid) and 2-hydroxyethyliminobis(methylenephosphonic acid).

The phosphonic acids include 2-hydroxyphosphonoacetic acid, 2-phosphonobutane-1,2,4-tricarboxylic acid, 1-hydroxyethane-1,1-diphosphonic acid, ethylenediaminetetra-(methylenephosphonic acid), diethylenetriaminepenta(methylenephosphonic acid), bis(hexamethylene)triaminepenta (methylenephosphonic acid) and nitrilotris(methylenephosphonic acid), of which 1-hydroxyethane-1,1-diphosphonic acid is particularly preferred.

The acid promoter is added, preferably in the form of the free acid, to the solution of the aminocarboxylic acid salt.

Alternatively, the acid promoter can be used in the form of a non-quaternary ammonium salt, i.e. as ammonium salt ($NH_4^+$ salt) or salt of a primary, secondary or tertiary ammonium ion. Under the conditions of regeneration of the absorption medium, the free acid can be liberated from the non-quaternary ammonium salt. Suitable ammonium salts are the protonated species of primary, secondary or tertiary alkylamines and/or alkanolamines. Alkanolamines comprise at least one nitrogen atom which is substituted by at least one hydroxyalkyl group, in particular a $C_2$-$C_3$-hydroxyalkyl group, usually a 2-hydroxyethyl or 3-hydroxypropyl group. Suitable alkanolamines are selected, e.g., from monoethanolamine (MEA), diethanolamine (DEA), diisopropanolamine, triethanolamine (TEA), diethylethanolamine (DEEA), aminoethoxyethanol (AEE), dimethylaminopropanol (DIMAP) and methyldiethanolamine (MDEA), methyldiisopropanolamine (MDIPA), methyldiisopropanolamine (MDIPA), 2-amino-2-methyl-1-propanol (AMP), 2-amino-1-butanol (2-AB) or mixtures thereof.

The aminocarboxylic acid is preferably selected from α-amino acids, β-amino acids, γ-amino acids, δ-amino acids, ε-amino acids and ζ-amino acids.

Suitable aminocarboxylic acids are, for example,

α-amino acids such as glycine (aminoacetic acid), N-methylglycine(N-methylaminoacetic acid, sarcosine), N,N-dimethylglycine(dimethylaminoacetic acid), N-ethylglycine, N,N-diethylglycine, alanine(2-aminopropionic acid), N-methylalanine(2-(methylamino)propionic acid), N,N-dimethylalanine, N-ethylalanine, 2-methylalanine(2-aminoisobutyric acid), leucine(2-amino-4-methylpentan-1-oic acid), N-methylleucine, N,N-dimethylleucine, isoleucine(1-amino-2-methylpentanoic acid), N-methylisoleucine, N,N-dimethylisoleucine, valine(2-aminoisovaleric acid), α-methylvaline(2-amino-2-methylisovaleric acid), N-methylvaline (2-methylaminoisovaleric acid), N,N-dimethylvaline, proline(pyrrolidine-2-carboxylic acid), N-methylproline, serine(2-amino-3-hydroxypropan-1-oic acid), N-methylserine, N,N-dimethylserine, 2-(methylamino)isobutyric acid, piperidine-2-carboxylic acid, N-methylpiperidine-2-carboxylic acid, β-amino acids such as 3-aminopropionic acid (β-alanine), 3-methylaminopropionic acid, 3-dimethylaminopropionic acid, iminodipropionic acid, N-methyliminodipropionic acid, piperidine-3-carboxylic acid, N-methylpiperidine-3-carboxylic acid, γ-amino acids such as 4-aminobutyric acid, 4-methylaminobutyric acid, 4-dimethylaminobutyric acid, or aminocarboxylic acids such as piperidine-4-carboxylic acid, N-methylpiperidine-4-carboxylic acid.

Particularly suitable aminocarboxylic acids are N-mono-$C_1$-$C_4$-alkylaminocarboxylic acids and N,N-di-$C_1$-$C_4$-alkylaminocarboxylic acids, in particular N-mono-$C_1$-$C_4$-alkyl-α-aminocarboxylic acids and N,N-di-$C_1$-$C_4$-alkyl-α-aminocarboxylic acids.

The metal salt is generally an alkali metal or alkaline earth metal salt, preferably an alkali metal salt such as a sodium or potassium salt, of which potassium salts are most preferred.

Preferred metal salts of an aminocarboxylic acid are those of the general formula V

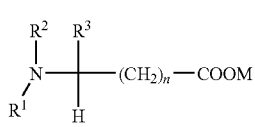

(V)

where $R^1$, $R^2$ and $R^3$ independently of one another are H or $C_1$-$C_3$-alkyl, M is Na or K, and n is an integer from 0 to 5.

Particularly preferred metal salts of aminocarboxylic acids are the potassium salt of dimethylglycine or N-methylalanine.

Generally, the aqueous solution comprises 2 to 5 kmol/m³, in particular 3.5 to 4.5 kmol/m³, of metal salt of the aminocarboxylic acid.

The absorption medium can also comprise additives, such as corrosion inhibitors, enzymes etc. Generally, the amount of such additives is in the range of about 0.01-3% by weight of the absorption medium.

The invention relates additionally to a process for removing acid gases from a fluid stream, in which process the fluid stream is brought into contact with the abovedefined absorption medium.

Generally, the loaded absorption medium is regenerated by
a) heating,
b) expansion,
c) stripping with an inert fluid
or by a combination of two or all of these measures.

The process or absorption medium according to the invention is suitable for treating fluids, in particular gas streams of all types. The acid gases are, in particular, $CO_2$, $H_2S$, COS and mercaptans. In addition, $SO_3$, $SO_2$, $CS_2$ and HCN can also be removed. Fluids which comprise the acid gases are firstly gases such as natural gas, synthesis gas, coke furnace gas, cracked gas, coal gasification gas, recycled gas, landfill gases and combustion gases, and secondly liquids which are essentially immiscible with the absorption medium, such as LPG (liquefied petroleum gas) or NGL (natural gas liquids). The process or absorption medium according to the invention is particularly suitable for treating hydrocarbonaceous fluid streams. The hydrocarbons present are, e.g., aliphatic hydrocarbons, such as $C_1$-$C_4$ hydrocarbons, such as methane, unsaturated hydrocarbons, such as ethylene or propylene, or aromatic hydrocarbons, such as benzene, toluene or xylene. The process or absorption medium according to the invention is particularly suitable for removing $CO_2$ and $H_2S$.

In preferred embodiments, the fluid stream is
(i) a fluid stream comprising hydrogen or a fluid stream comprising hydrogen and carbon dioxide; these include synthesis gases which can be produced, e.g., by coal gasification or steam reforming and are optionally subjected to a water gas shift reaction; the synthesis gases are used, e.g., for producing ammonia, methanol, formaldehyde, acetic acid, urea, for the Fischer-Tropsch synthesis or for energy production in an integrated gasification combined cycle (IGCC) process
(ii) a fluid stream comprising hydrocarbons; these include, in addition to natural gas, offgases of various refinery processes, such as the tailgas unit (TGU), a visbreaker (VDU), a catalytic cracker (LRCUU/FCC), a hydrocracker (HCU), a hydrotreater (HDS/HTU), a coker (DCU), an atmospheric distillation (CDU) or a liquid treater (e.g. LPG).

The process according to the invention is suitable for the selective removal of hydrogen sulfide in comparison with $CO_2$. "Selective removal of hydrogen sulfide" is taken to mean that the following inequality is satisfied $$\frac{\frac{c(H_2S)_{feed} - c(H_2S)_{treat}}{c(H_2S)_{feed}}}{\frac{c(CO_2)_{feed} - c(CO_2)_{treat}}{c(CO_2)_{feed}}} > 1$$

where $c(H_2S)_{feed}$ is the concentration of $H_2S$ in the feed fluid, $c(H_2S)_{treat}$ is the concentration in the treated fluid, $c(CO_2)_{feed}$ is the concentration of $CO_2$ in the feed fluid and $c(CO_2)_{treat}$ is the concentration of $CO_2$ in the treated fluid.

The selective removal of $H_2S$ is advantageous, e.g., a) for maintaining a preset $H_2S$ specification when the maximum acid gas total loading capacity of the absorption medium is already achieved and b) for setting a higher $H_2S/CO_2$ ratio in the acid gas stream which is released in the regeneration of the absorption medium and which is typically run in a Claus plant. An acid gas stream having a higher $H_2S/CO_2$ ratio has a higher calorific value and suppresses the formation of COS (from $CO_2$) which impairs the service life of the Claus catalyst.

In the process according to the invention the feed fluid (raw gas) which is rich in acid gas components is, in an absorption step, brought into contact with the absorption medium in an absorber, as a result of which the acid gas components are at least in part scrubbed out.

The device which acts as absorber is preferably a scrubbing device used in customary gas scrubbing processes. Suitable scrubbing devices are, for example, dumped-bed packed columns, arranged-packing columns and tray columns, membrane contacters, radial flow scrubbers, jet scrubbers, venturi scrubbers and rotary spray scrubbers, preferably arranged-packing columns, dumped-bed packed columns and tray columns, particularly preferably tray columns and dumped-bed packed columns. The fluid stream is treated with the absorption medium in this case preferably in a column in counterflow. The fluid in this case is generally fed into the lower region of the column and the absorption medium into the upper region. In tray columns, sieve trays, bubble-cap trays or valve trays are built in, over which the liquid flows. Dumped-bed packed columns can be packed with different shaped bodies. Heat exchange and mass transfer are improved by the enlargement of the surface area owing to the shaped bodies which are usually about 25 to 80 mm in size. Known examples are the Raschig ring (a hollow cylinder), Pall ring, Hiflow ring, Intalox saddle and the like. The packings can be introduced into the column in an ordered manner or else randomly (as a bed). The materials which come into consideration are glass, ceramic, metal and plastics. Structured packings are a further development of the ordered packings. They have a regularly shaped structure. As a result, it is possible in the case of arranged packings to reduce pressure drops in the gas stream. There are various designs of arranged packings, e.g. fabric or sheet metal arranged packings. The materials which can be used are metal, plastic, glass and ceramic.

The temperature of the absorption medium is, in the absorption step, generally about 30 to 100° C., when a column is used, for example 30 to 70° C. at the top of the column and 50 to 100° C. at the bottom of the column. The total pressure in the absorption step is generally about 1 to 120 bar, preferably about 10 to 100 bar.

A product gas (clean gas) which is low in acid gas components, i.e. is depleted in these components, and an absorption medium which is loaded with acid gas components are obtained. The process according to the invention can comprise one or more, in particular two, successive absorption steps. The absorption can be carried out in a plurality of successive substeps, wherein the raw gas comprising the acid gas components is brought into contact in each of the substeps with in each case one substream of the absorption medium. The absorption medium with which the raw gas is brought into contact can already be in part loaded with acid gases, i.e. it can be, for example, an absorption medium which was recirculated from a subsequent absorption step to the first absorption step, or partially regenerated absorption medium. With respect to carrying out the two-stage absorption, reference is made to the publications EP-A 0 159 495, EP-A 0 190 434, EP-A 0 359 991 and WO 00/00271.

According to a preferred embodiment, the process according to the invention is carried out in such a manner that the fluid comprising the acid gases is first treated with the absorption medium in a first absorption step at a temperature of 40 to 100° C., preferably 50 to 90° C., and in particular 60 to 90° C. The fluid depleted in acid gases is then treated with the absorption medium in a second absorption step at a temperature of 30 to 90° C., preferably 40 to 80° C., and in particular 50 to 80° C. In this case the temperature is 5 to 20° C. lower than in the first absorption stage.

The acid gas components can be liberated from the absorption medium loaded with the acid gas components in a conventional manner (similarly to the publications cited hereinafter) in a regeneration step, wherein a regenerated absorption medium is obtained. In the regeneration step the loading of the absorption medium is reduced and the resultant regenerated absorption medium is preferably subsequently recirculated to the absorption step.

Generally, the regeneration step comprises at least one pressure expansion of the loaded absorption medium from a high pressure, such as prevails when the absorption step is being carried out, to a lower pressure. The pressure expansion can be achieved, for example, using a throttle valve and/or an expansion turbine. Regeneration with an expansion stage is described, for example, in the publications U.S. Pat. No. 4,537,753 and U.S. Pat. No. 4,553,984.

The acid gas components can be liberated in the regeneration step, for example in an expansion column, e.g. in a vertical or horizontal flash vessel or a countercurrent-flow column with internals.

The regeneration column can likewise be a dumped-bed packed column, arranged-packing column or tray column. The regeneration column, at the bottom, has a heater, e.g. a forced circulation evaporator with recirculation pump. At the top, the regeneration column has an outlet for the liberated acid gases. Entrained absorption medium vapors are condensed in a condenser and recirculated to the column.

A plurality of expansion columns can be connected in series in which regeneration is carried out at different pressures. For example, regeneration can be carried out in a pre-expansion column at high pressure which is typically about 1.5 bar above the partial pressure of the acid gas components in the absorption step, and in a main expansion column at low pressure, for example 1 to 2 bar absolute. Regeneration using two or more expansion stages is described in the publications U.S. Pat. No. 4,537,753, U.S. Pat. No. 4,553,984, EP-A 0 159 495, EP-A 0 202 600, EP-A 0 190 434 and EP-A 0 121 109.

A process variant having two low-pressure expansion stages (1 to 2 bar absolute) in which the absorption liquid which is partially regenerated in the first low-pressure expansion stage is heated and in which a medium-pressure expansion stage is optionally provided upstream of the first low-pressure expansion stage, in which medium-pressure expansion stage the expansion is performed to at least 3 bar, is described in DE 100 28 637. In this process the loaded absorption liquid is first expanded in a first low-pressure expansion stage to a pressure of 1 to 2 bar (absolute). Subsequently, the partially regenerated absorption liquid is heated in a heat exchanger and then expanded again to a pressure of 1 to 2 bar (absolute) in a second low-pressure expansion stage.

The last expansion stage can also be carried out under vacuum which is generated, for example, by means of a steam jet, optionally in combination with a mechanical vacuum generation apparatus, as described in EP-A 0 159 495, EP-A 0 202 600, EP-A 0 190 434 and EP-A 0 121 109 (U.S. Pat. No. 4,551,158).

Because of the optimum matching of the content to the amine components, the absorption medium according to the invention has a high ability to be loaded with acid gases which can also be readily desorbed again. As a result, in the process according to the invention, the energy consumption and the solvent circulation are significantly reduced.

The invention will be illustrated in more detail with reference to the accompanying drawing and the examples hereinafter.

BRIEF DESCRIPTION OF THE DRAWING

FIG. 1 is a schematic drawing of a system suitable for carrying out the process according to the invention.

According to FIG. 1, via a feedline 1, a suitably pretreated gas comprising acid gases is brought into contact in an absorber 2 in countercurrent flow with the regenerated absorption medium which is fed via the absorption medium line 3. The absorption medium removes acid gases from the gas by absorption; in this process a clean gas low in acid gases is obtained via an offgas line 4.

Via an absorption medium line 5, a pump 12, a solvent-solvent heat exchanger 11 in which the absorption medium which is loaded with acid gas is heated with the heat of the regenerated absorption medium exiting from the bottom of the desorption column 7, and a throttle valve 6, the absorption medium which is loaded with acid gas is fed to a desorption column 7. In the lower part of the desorption column 7 the loaded absorption medium is heated by means of a heater (which is not shown) and regenerated. The resultant liberated acid gas leaves the desorption column 7 via the offgas line 8. The regenerated absorption medium is subsequently recirculated by means of a pump 9 via the solvent-solvent heat exchanger 11 in which the regenerated absorption medium heats the absorption medium which is loaded with acid gas and is itself cooled in the process, and a heat exchanger 10 of the absorption column 2.

EXAMPLE

A 39% strength by weight solution of N,N-dimethylglycine, potassium salt, was produced. Aliquots of 200 ml were admixed with 1% by weight of phosphoric acid ($H_3PO_4$) or 2% by weight of 1-hydroxyethane-1,1-diphosphonic acid (HEDP). A further aliquot served as control.

The three solutions were loaded with $H_2S$ at 50° C. at atmospheric pressure to equilibrium. The $H_2S$ equilibrium loading was determined by potentiometric titration against silver nitrate.

Subsequently, the solutions, for simulation of the regeneration process, were boiled at a constant 100° C. in an oil bath in an Erlenmeyer flask with an attached reflux cooler. In this process in each case 10 Nl/h of nitrogen gas were bubbled through the liquid in order to improve the exchange between gas and liquid phases and to remove the liberated $H_2S$ via the cooler.

After defined time intervals, in each case samples of 20 ml were taken and the $H_2S$ content again determined by potentiometric titration against silver nitrate. The results are summarized in the table hereinafter.

|  | Example | | |
| --- | --- | --- | --- |
|  | 1 | 2 | 3 |
| Promoter | Without | $H_3PO_4$ | HEDP |
| $H_2S$ equilibrium loading at 50° C. | 54.41 | 50.83 | 57.17 |
| $[Nm^3]_{H2S}$/t $H_2S$ loading based on starting value [%] after | | | |
| 0 min | 100.0 | 100.0 | 100.0 |
| 15 min | 50.0 | 51.1 | 58.3 |
| 45 min | 33.7 | 32.5 | 27.1 |
| 105 min | 21.7 | 21.0 | 13.7 |
| 225 min | 14.5 | 10.9 | 3.6 |
| 405 min | 6.6 | 3.5 | 0.4 |

It is clear from the experimental results that regeneration to a preset residual loading (e.g. less than 10%) in examples 2 and 3 (with acid promoter) is achieved more rapidly than in comparative example 1. Since in the experimental arrangement selected, the energy input is proportional to the product of the constant heat stream and the time, the regeneration energy required is less in examples 2 and 3.

The invention claimed is:

1. An absorption medium for removing acid gases from a fluid stream which comprises an aqueous solution
    a) of at least one metal salt of an aminocarboxylic acid, and
    b) of at least one acid promoter selected from organic phosphonic acids, partial esters thereof or non-quaternary ammonium salts thereof,
    wherein the aqueous solution comprises 2 to 5 kmol/m³ of metal salt of the aminocarboxylic acid and wherein the molar ratio of b) to a) is in the range from 0.0005 to 1.0.

2. The absorption medium according to claim 1, wherein the acid promoter comprises a multibasic acid.

3. The absorption medium according to claim 1, wherein the acid promoter comprises 1-hydroxyethane-1,1-diphosphonic acid.

4. The absorption medium according to claim 1, wherein the aminocarboxylic acid is selected from α-amino acids, β-amino acids, γ-amino acids, δ-amino acids, ε-amino acids and ζ-amino acids.

5. The absorption medium according to claim 1, wherein the aminocarboxylic acid is an N-mono-$C_1$-$C_4$-alkylaminocarboxylic acid or an N,N-di-$C_1$-$C_4$-alkylaminocarboxylic acid.

6. The absorption medium according to claim 1, wherein the metal salt of the aminocarboxylic acid is the potassium salt of dimethylglycine or N-methylalanine 7. A process for removing acid gases from a fluid stream, in which process the fluid stream is brought into contact with absorption medium according to claim 1.

8. The process according to claim 7 for selective removal of hydrogen sulfide.

9. The process according to claim 7, wherein the fluid stream comprises hydrocarbons.

10. The process according to claim 7, wherein the loaded absorption medium is regenerated by
    a) heating,
    b) expansion,
    c) stripping with an inert fluid
    or by a combination of two or all of these measures.

* * * * *